United States Patent [19]

Krechmery

[11] 4,222,815
[45] Sep. 16, 1980

[54] ISOTROPIC ETCHING OF SILICON STRAIN GAGES

[75] Inventor: Roger L. Krechmery, Mentor, Ohio

[73] Assignee: The Babcock & Wilcox Company, New York, N.Y.

[21] Appl. No.: 45,499

[22] Filed: Jun. 4, 1979

[51] Int. Cl.² .................. G01L 1/22; H01L 21/308
[52] U.S. Cl. ........................ 156/630; 29/610 SG; 156/657; 156/659.1; 156/662; 338/4; 427/88
[58] Field of Search ............ 156/630, 644, 657, 659, 156/662; 204/129.65; 29/610 SG; 427/88; 338/4; 250/492 A

[56] References Cited

U.S. PATENT DOCUMENTS

| | | | |
|---|---|---|---|
| 3,677,848 | 7/1972 | Stoller et al. | 156/662 |
| 3,701,705 | 10/1972 | Hetrich | 156/662 |
| 3,743,842 | 7/1973 | Smith | 250/492 A |
| 4,019,388 | 4/1977 | Hall et al. | 338/4 |
| 4,025,942 | 5/1977 | Kurtz | 338/4 |
| 4,170,512 | 10/1979 | Flanders et al. | 250/492 A |

Primary Examiner—Jerome W. Massie
Attorney, Agent, or Firm—Vytas R. Matas; Joseph M. Maguire

[57] ABSTRACT

A method of etching a silicon diffused resistance pressure transducer assembly (13) of a transducer (10) mounted on a glass base (14) providing a thin flexible area on the transducer in the region of the diffused resistors (15) and a thick rigid area in the region where the transducer is mounted to the glass base (14). To accomplish this, the transducer (10) is first bonded to the glass base (14) which is tubular, thus providing a circular area on the backside (16) of the transducer (10) open to ambient. This open area is then filled with an isotropic etchant which etches silicon material but which has little effect on glass material. Thus, the region of the diffused resistors (15) is etched out to provide a thin flexible area while leaving a thick area where the transducer (10) is mounted to the glass base (14).

5 Claims, 2 Drawing Figures

ISOTROPIC ETCHING OF SILICON STRAIN GAGES

TECHNICAL FIELD

The present invention relates to isotropic etching of silicon materials generally and in particular to a method of back-etching a silicon diffused resistance strain gage to provide a strain gage having a thin sensitive area in the region of the diffused resistors and a relatively thick area in the mounting region.

BACKGROUND ART

Chemical etching of silicon materials is well-known as is indicated in U.S. Pat. No. 3,839,111 entitled "METHOD OF ETCHING SILICON OXIDE TO PRODUCE A TAPERED EDGE THEREON", Inventors: Edward John Ham and Ralph Robert Soden; U.S. Pat. No. 3,934,057 entitled "HIGH SENSITIVITY POSITIVE RESIST LAYERS AND MASK FORMATION PROCESS", Inventors: Wayne M. Moreau and Chiu H. Ting; and U.S. Pat. No. 3,737,314 entitled "MANUFACTURE OF PRINTING ELEMENTS BY A PHOTORESIST CHEMICAL ETCHING SYSTEM", Inventors: Robert L. Ruleff, William P. Lee II, Jay W. Childress, and Donald H. Knapke. These forementioned references teach both selective and non-selective etching for a variety of purposes in semiconductor fabrication.

Turning to the particular area of semiconductor pressure transducer fabrication, etching and other means of selective removal of silicon has also found wide usage. The semiconductor pressure sensor is typically formed as a diaphragm made of silicon material having a thickness dependent upon the measured pressure range. Stain sensitive resistors are diffused into the face of the diaphragm using known standard semiconductor techniques. The silicon diaphragm is also usually mounted to a support made of silicon or other material of suitable strength and compatible characteristics. A disadvantage of this usual type of structure is that very high stresses are generated at the bond area between the pressure sensitive diaphragm and its support base. The characteristics of the base material as well as the materials used to bond the diaphragm to the base can cause creep and instabilities when subjected to this stress. Clearly, what is needed is a diaphragm which will be thick and rigid and strong in the area of the mounting of the pressure sensitive diaphragm to the base and which is thin, flexible and sensitive to pressure in the area of the diffused resistors.

To achieve these mentioned results, some prior art pressure sensitive diaphragms were fabricated out of a single block of material to provide both the pressure sensitive area as well as the mounting base. No joint exists between the diaphragm and the mounting base to contribute to creep or instability. However, fabrication of this type of structure requires the forming of a hole into the silicon material which hole will be precisely located with respect to the diffused resistors on the other side of the diaphragm. The bottom of this hole should be substantially flat in the area of the diffused resistors with a good surface finish. Typical hole depths required vary from 5 to 10 mils to as much as 75 to 100 mils. A variety of fabrication methods have been used to form this hole. These methods include electro-discharge machining followed by an electro-chemical etch or polish, ultrasonic drilling or machining followed by electro-chemical etch or polish, and chemical or electro-chemical etching.

Electro-discharge machining and ultrasonic drilling are quite effective in forming the structure. However, they are complicated processes requiring elaborate equipment which can be very expensive. Further, these processes are subject to tool wear and require the two-step process, machining following by polishing or etching, to obtain the required surface finish.

The known chemical or electro-chemical etching involves usually the use of an etchant such as $KOH:H_2O$ which may be used with silicon of the proper crystallographic orientation. The selective etch has different etch rates in different crystallographic directions which when combined with silicon of the proper orientation can etch a vertical wall. For etching circular holes, non-selective etchants (isotropic) are commonly used. The major problem with the isotropic etchant which is commonly a mixture of HF and $HNO_3$ is masking to control the location of the etch. Photoresist is usually used for masking the $KOH:H_2O$ etchant with very successful results. However, similar techniques for masking the isotropic etchants such as $HF:HNO_3$ fail because of mask undercutting. Hence, selective etching with isotropic etchants such as $HF:HNO_3$ has been difficult to do because of the lack of a suitable mask. To overcome this masking problem, various methods of electro-chemical etching have been developed, using weak solution of $HF:HNO_3$ which can be successfully masked. The etch rate achieved, however, is very slow and not suitable for etching deep wall holes as required for the manufacture of pressure transducers having thin walls in the diffused resistor area and thick strong walls in the area mounted to the base.

SUMMARY OF THE INVENTION

To eliminate the problems of the prior art etching techniques, of cylindrical Borosilicate glass base is provided to which a silicon diffused resistance pressure transducer is mounted on one end thereof by known techniques. The transducer is mounted to the glass base with the diffused resistors on the outside of the glass base and is affixed thereto by known techniques such as epoxying. The transducer is mounted as a thick silicon chip approximately 0.064 inches thickness allowing the transducer to be easily bonded to the glass tube without danger of breakage. Next, the assembly is placed on a flat surface with the transducer lying face down to have the glass cylinder forming a cup thereover. The glass tubular base is then filled with an isotropic etchant such as $HF:HNO_3$. This isotropic etchant material acts on the exposed backside of the silicon pressure transducer to etch out a circular area unmasked by the glass base. Glass is substantially unaffected by the isotropic etchant and thus leaves a thick mounting area mounting the transducer to the glass base. The open circular area of the silicon transducer is etched out to a thickness of substantially 0.025 inches in the area of the diffused resistors.

This allows the transducer to have a thin flexible and even area in the region of the diffused resistors, thus making the resistors sensitive to pressure. In the area where the transducer is mounted to the glass base, the thickness remains at the original thickness of the transducer providing strength and stability. Furthermore, the assembly of the silicon transducer and its glass support may now be easily bonded to the metal housing of a pressure transmitter by way of a nickel-iron alloy holder which is compatible with both the metal housing of the pressure transmitter as well as the glass support for the silicon pressure transducer.

In view of the foregoing, it will be seen that one aspect of the present invention is to provide a simple one step method of etching a diffused resistance pressure transducer assembly utilizing an isotropic etchant.

Another aspect of the present invention is to provide a method of manufacturing a diffused resistance pressure transducer assembly which will be flexible in the area of the diffused resistors and rigid in the area where the transducer is mounted to a base.

These and other aspects of the present invention will be more fully understood after a review of the following description of the preferred embodiment when considered with the drawings.

DESCRIPTION OF THE PREFERRED EMBODIMENT

Figure 1:
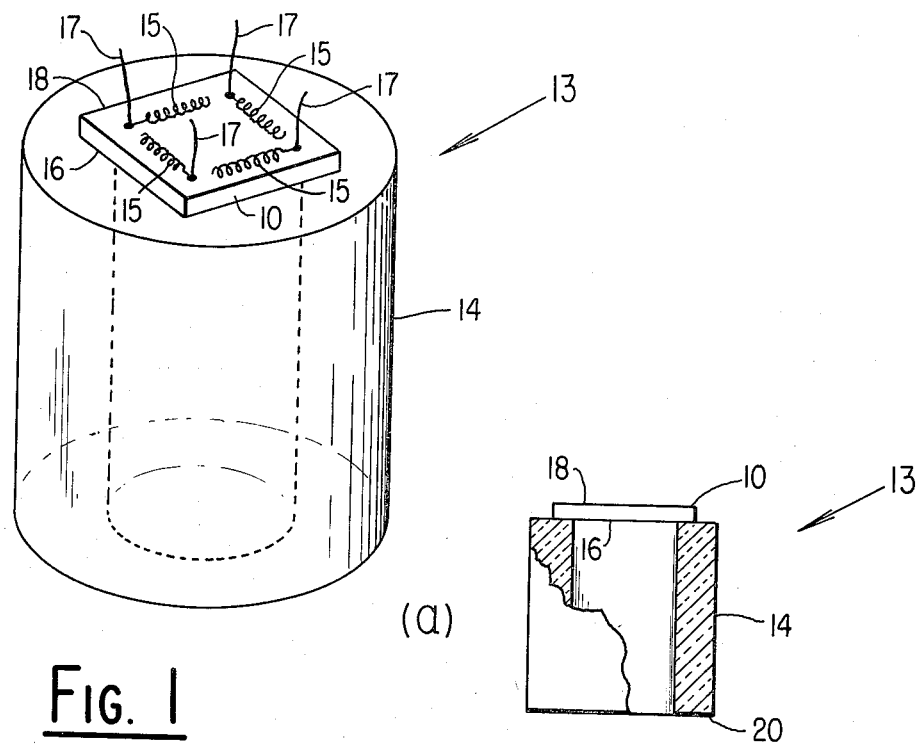
FIG. 1 is an isometric view of the pressure transducer assembly.

Referring now to the drawings a pressure sensitive silicon chip 10 is shown mounted to a tubular support base of glass material 14 to form a pressure transducer assembly 13. The silicon chip 10 has a series of resistance elements 15 diffused in the face of the silicon chip which elements 15 change resistance whenever the chip 10 is stressed due to any pressure differential established between the faces 16 and 18 of the silicon chip 10. The resistance elements 15 have electrical leads 17 individually connected to each of the resistance elements 15 for interconnection to form a Wheatstone Bridge connection of the resistance elements 15 to external circuitry (not shown).

The cylindrical base 14 is a Borosilicate glass tubular holder formed from 7740 Pyrex material to have an internal diameter of approximately 0.20 inches and a height of approximately 0.40 inches. This material was found to have a coefficient of temperature expansion compatible with that of the silicon chip 10 in the normal operating temperature ranges of most electronic pressure transmitters (minus 40 degrees F. to over 250 degrees F.). One end of the tubular housing 14 is sealed by mounting the silicon chip 10 thereon, using any number of known adhesives and bonds such as epoxy or electrostatic bonding. The opposite end of the tubular holder 14 may be metallized and bonded to a nickel-iron holder which is easily mounted to a metal housing of known pressure transmitter as is more fully described in U.S. Pat. No. 4,019,388, entitled "GLASS TO METAL SEAL", Inventors: George R. Hall, II, Jack M. White, and Roger L. Krechmery.

It will be understood that to have optimum performance of the pressure transmitter, the area of the silicon chip 10 in the region of the diffused resistors 15 should be relatively thin and flexible to provide maximum sensitivity and resistance change to stress with the application of pressures across the silicon chip 10. The actual thickness depends on the pressure range that will be measured. As an example, a 50 psi range requires a thickness of approximately 0.006 inches whereas a 4500 psi range requires a thickness of approximately 0.064 inches. These thicknesses make the silicon chip fragile and susceptible to damage during assembly of the silicon chip to the glass base 4. Furthermore, the thin section of the silicon chip 10, in the area wherein the chip 10 is mounted to the base 14, is then subjected to stresses during the use of the assembly in a pressure transducer which stresses cause creep and instability errors to occur in the instrument. What is desirable to eliminate this, is to have a relatively thick silicon chip in the region of the mounting of the chip 10 to the base 14.

Both of these aims seem contradictory to each other and the Applicant has found that this contradiction may be resolved by etching the silicon chip 10 to the desired thickness or thinness in the area of the diffused resistors after the silicon chip has been bonded to the base 14. To accomplish this, the following method of back-etching is utilized on the assembly consisting of the silicon chip sealably bonded to the glass base 14.

Figure 2:
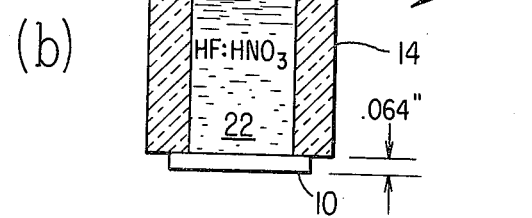
FIG. 2 shows the steps of manufacturing the back etched diffused resistance pressure transducer assembly of FIG. 1.
Figure 2:
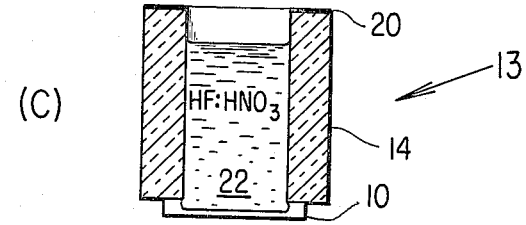
Figure 2:
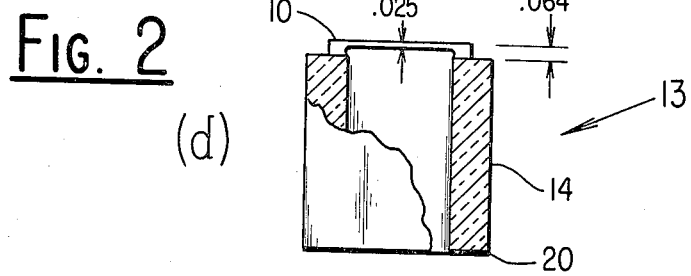

Referring now to FIG. 2, it will be seen that the method of back-etching a silicon diffused resistance pressure transducer assembly comprises the following steps.

The pressure transducer assembly 13 is provided having a transducer 10 which is approximately 0.064 inches thick and substantially rectangular in shape mounted to the glass base 14 to cover the open end of the cylindrical base 14. The other end of the base 14 is metallized with a chrome, silver, and gold alloy 20 which is impervious to the etchant that will be used to back-etch the transducer 10 and therefore will prevent the formation of any irregular surfaces on that end of the base 14. This is necessary since this end of the base 14 is mounted to a pressure measuring instrument (not shown) and requires a smooth and regular surface to provide a leakproof seal between the base 14 and the mounting to the instrument.

The assembly 13 is then placed on a flat surface with the transducer 10 on the surface and the inside volume of the base 14 is filled with approximately 0.0125 cubic inches of an isotropic etchant 22. The particular isotropic etchant used was a mixture of hydrofluoric acid and nitric acid (HF:HNO$_3$). The etchant 22 was made by forming a solution of 49 percent pure hydrofluoric acid and 70 percent pure nitric acid which had 40 percent of the aforementioned hydrofluoric acid and 60 percent of the aforementioned nitric acid in the solution with the percentages being percentages of the total volume of the solution. The 40 percent hydrofluoric acid solution was used since it was found that a 50 percent solution was too rapid to control properly whereas the 30 percent solutions and lower were too slow to provide optimum etching.

The forementioned 40 percent solution of hydrofluoric acid to 60 percent nitric acid when exposed to the silicon material of the transducer 10 caused an etching of the transducer 10 material at a rate of approximately 2 mils per minute. By contrast, the forementioned etchant solution was relatively inoperative on the glass base 14 with the etching proceeding there at a rate of approximately 0.4 mils per minute or one-fifth the etching rate on the transducer 10. The particular volume of etchant solution used was seen to lose its activity after approximately two minutes of etching action and therefore the solution of etchant 22 had to be replenished prior to its depletion to insure an etching down to the thickness desired. In lieu of intermittent replenishing of the etchant solution 22, a metered continuous flow of the etchant material could be provided which would insure the continuous activity of the etchant solution 22 allowing a more accurate and repeatable determination of ultimate transducer 10 thickness by timing the exposure to the etchant solution 22.

This particular assembly 13 had the transducer 10 back-etched to a thickness of 0.025 inches since that is the thickness desired for a 600 psi range. The transducer 10 could have been further exposed to the etchant solution 22 and etched down to a thickness of 0.006 inches where the assembly 13 is intended for a 50 psi range.

When the predetermined time of exposure of the continuously fed or intermittently changed etchant solution 22 to the transducer 10 and the base 14 has expired, which has been predetermined to provide the necessary thickness of transducer 10, the assembly 13 is removed from any flow of etchant solution 22 and any residual solution 22 is dumped from it thereby stopping any further etching action. The metallizing 20 on the other end of the base 14 prevents any forming of irregularities on that surface insuring a proper mounting surface for the assembly 13. The etchant solution 22, as was mentioned, does etch the glass of the base 14 but at a significantly slower rate than the silicon transducer 10. The etching of the glass base 14 is not a factor because the 0.2 inch starting internal diameter of the base 14 is relatively unaffected due to the insignificant etching rate on the glass. To further insure that the glass of the base 14 is not thinned below a minimum amount required for strength, the base 14 is usually made of a relatively thick glass on the order of ⅜ of an inch.

Certain modifications and improvements will occur to those skilled in the art upon reading this specification. It will be understood that all such improvements and modifications have been deleted herein for the sake of conciseness and readability but are properly within the scope of the following claims.

I claim:

1. A method of etching a silicon diffused resistance pressure transducer comprising the steps of:
   providing a tubular support base of glass material;
   mounting a silicon diffused resistance pressure transducer on one end of said tubular support base with the diffused resistors on the side opposite the side mounted to said tubular support base;
   maintaining a volume of active isotropic etchant solution on the mounted side of said silicon diffused resistance pressure transducer for a predetermined time; and
   removing said isotropic etchant solution from said silicon diffused resistance pressure transducer after said predetermined time to prevent further etching and to provide a silicon diffused resistance pressure transducer having a desired thickness in the area of the diffused resistors.

2. A method as set forth in claim 1 wherein said isotropic etchant solution is a solution of hydrofluoric and nitric acids.

3. A method as set forth in claim 2 wherein said solution includes 40 percent by volume of a 49 percent pure hydrofluoric acid solution and 60 percent by volume of a 70 percent pure nitric acid solution.

4. A method as set forth in claim 1 wherein the end of said tubular support base opposite said silicon diffused resistance pressure transducer is metallized prior to filling said tubular support base with an isotropic etchant to prevent the etching of that surface of said base.

5. A method as set forth in claim 4 wherein said metallizing is done with a chrome-silver-gold alloy.

* * * * *